(12) United States Patent
Manickam et al.

(10) Patent No.: US 8,305,256 B1
(45) Date of Patent: Nov. 6, 2012

(54) RADAR WITH PRF ALTERATION ON RECEIVE

(75) Inventors: Arul Manickam, Philadelphia, PA (US); Gregory P. Fonder, Tenafly, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 465 days.

(21) Appl. No.: 12/702,664

(22) Filed: Feb. 9, 2010

(51) Int. Cl.
*G01S 13/58* (2006.01)

(52) U.S. Cl. ........ 342/111; 342/109; 342/116; 342/128; 342/132

(58) Field of Classification Search .................... 342/111
See application file for complete search history.

(56) References Cited

U.S. PATENT DOCUMENTS

| | | | |
|---|---|---|---|
| H1720 H * | 4/1998 | Chen | 342/25 E |
| 5,745,069 A * | 4/1998 | Gail | 342/25 F |
| 6,639,546 B1 | 10/2003 | Ott et al. | |
| 6,989,782 B2 * | 1/2006 | Walker et al. | 342/134 |
| 7,535,408 B2 * | 5/2009 | Kuhn | 342/129 |
| 2007/0285302 A1 * | 12/2007 | Aarseth et al. | 342/25 R |

* cited by examiner

*Primary Examiner* — John B Sotomayor
*Assistant Examiner* — Matthew M Barker
(74) *Attorney, Agent, or Firm* — Howard IP Law Group, P.C.

(57) ABSTRACT

A radar system achieves unambiguous target range at a given PRI, in conjunction with unambiguous Doppler, by transmitting CW-LFM pulses and then separating the return signal into subpulses, without requiring any modifications to the transmit waveform. The CW-LFM pulses may be contiguous. The return signals are bandpass-filtered to generate the subpulses, and downconverted to a common frequency such as baseband. Each downconverted subpulse is matched-filtered to the FM slope, and the resulting matched-filtered subpulses are time-aligned. The time-aligned subpulses are Doppler-filtered to determine target velocity.

16 Claims, 14 Drawing Sheets

SUMMARY

| PARAMETER | TRADITIONAL RADAR | CW-LFM RADAR IMPLEMENTING PAR |
|---|---|---|
| TRANSMIT PRI | $T$ | $T$ |
| TRANSMIT PULSES (FULL LFM) | $M$ | $M$ |
| TRANSMIT BW | $B$ | $B$ |
| SUBPULSES PER PULSE | 1 | $N$ |
| RECEIVE EFFECTIVE PRF | $1/T$ | $N/T$ |
| MAX UNAMBIGUOUS DOPPLER | $\pm\lambda/4T$ | $\pm N\lambda/4T$ |
| DOPPLER RESOLUTION | $\lambda/2MT$ | $\lambda/2MT$ |
| MAX UNAMBIGUOUS RANGE | $cT/2$ | $cT/2$ |
| RANGE RESOLUTION | $c/2B$ | $c/2BN^*$ |
| MATCHED FILTER GAIN | $T$ | $T/N$ |
| DOPPLER PROCESSING GAIN | $M$ | $MN$ |
| TOTAL GAIN | $TM$ | $TM$ |

*THIS REDUCTION IN RANGE RESOLUTION CAN BE AVOIDED BY SYNTHESIZING MULTIPLE RECEIVE PRFS SIMULTANEOUSLY

FIG. 13

RADAR WITH PRF ALTERATION ON RECEIVE

BACKGROUND

Radar, lidar, and sonar systems are in widespread use for military, commercial, and private purposes. Radar systems have well-known characteristics, in that long-range detection of small targets is known to require transmission of more power, higher-gain antennas, and/or more sensitive receivers than that or those required for short-range detection of large targets. Lidar and sonar systems have equally well known characteristics. Among the characteristics of radar systems used for detecting targets at long range are those relating to range ambiguity, which has to do with reception of signals returned from a target lying beyond the range defined by the pulse repetition interval, which may make the distant target appear to be near the radar system. Another such characteristic of radar is that of range eclipsing, which has to do with the inability of a radar receiver to receive return signals during the pulse transmission interval.

Radar, lidar and sonar systems are used, among other purposes, for volume surveillance and target tracking in both commercial and military contexts. Ideally, a radar (lidar, sonar) system would detect targets at any range within selected limits, and provide information allowing determination of the range, velocity, and azimuth and elevation position of the target. There are well-known limitations to which such systems are subject, such that the maximum range is limited by the available transmit power and the sensitivity of the receiver. Pulsed radar systems transmit their power in pulses of given duration, and "listen" for return or reflected signals during inter-pulse periods. For a given maximum transmit power, the breaking up of the radar transmissions into pulses necessarily results in transmission of less than the maximum possible total power, as transmissions cease during the inter-pulse listening periods defined by the Pulse Recurrence Frequency (PRF) and the pulse duration. The Pulse Recurrence Frequency (PRF) is the inverse of the Pulse Recurrence Interval (PRI). In order to obtain maximum range, it is desirable to transmit the maximum available total power in a continuous-wave (100% of the time) manner.

A conventional solution to range eclipsing is to vary the pulse repetition interval, so that the transmitted pulses are staggered over time, thereby allowing the receiver to periodically "see" returned signals at times which would otherwise be lost or eclipsed. The eclipsing still occurs for each individual pulse train, but the totality of the radar returns over time includes information which fills in the gaps attributable to the individual transmitted pulse trains. The tradeoff is that a longer time is required to produce all the information required for an uneclipsed view of the region. Another possible solution to range eclipsing is to reduce the duty cycle of the radar by reducing the transmitted pulse duration, to thereby reduce the duration of the eclipsing.

The reduction of the pulse duration, however, tends to reduce the transmitted energy, which reduces the range sensitivity, which again requires a longer period of integration in order to obtain the same effective range.

Another possible solution to range eclipsing is to reduce the duty cycle of the radar by increasing the pulse repetition interval, to thereby move the increased range interval to a distant range not of interest. The reduction of the duty cycle and increase in the pulse repetition interval, however, tends to consume additional radar resources resulting in a greater overall time required for completion of a surveillance scan.

Conventional range ambiguity resolution techniques require transmission of additional signals with additional dwells for resolving the range interval of the ambiguous target. The additional dwells or transmissions consume additional radar resources, resulting in a greater overall time required for completion of a surveillance scan. U.S. Pat. No. 6,639,546, issued Oct. 28, 2003 in the name of Ott et al. describes a radar system which provides unambiguous and uneclipsed range by virtue of pulse-to-pulse frequency diversity, in combination with alternating interpulse intervals and processing which fills in target information in ranges which would otherwise be eclipsed by transmitted pulses. The pulse-to-pulse frequency diversity provides a tag for each pulse that allows the individual pulses to be separately identified.

Continuous-wave linear-frequency-modulation (CW-LFM) radars use LFM waveforms with 100% duty cycle. FIG. 1A is a simplified amplitude-range/time diagram illustrating the unambiguous range associated with a single pulse 10 transmission, as from a ship 12, with a given PRF. In FIG. 1A, the transmitted pulse is illustrated as 10, and the unambiguous range at which a return is received from a first target 22 is designated R1. A return from a second target 24 at a range greater than R1 also lies within the unambiguous range at a range R2. Both targets 20 and 22 lie within the unambiguous range since there is no transmission of a second pulse, or alternatively because the pulse recurrence interval extends beyond the maximum illustrated range.

FIG. 1B is a simplified amplitude-range/time diagram illustrating transmission of multiple pulses 10a, 10b, 10c, 10d, separated by a given pulse recurrence interval (PRI) equal to 1/PRF. In FIG. 1B, the unambiguous range extends from time 0 to time 1/PRF, which is the time at which transmission of the second pulse 10b begins. The first ambiguous range interval extends from time 1/PRF to time 2/PRF, the second ambiguous range interval extends from time 2/PRF to time 3/PRF, and the third ambiguous range interval extends from time 3/PRF to 4/PRF. Targets occurring at ranges within the ambiguous range intervals will appear to be closer to the ship 12 than their actual range. Thus, the reflected or return signal 22a from target 22 occurs within the first range ambiguity, so its range may be interpreted as less than its actual range. The reflected signal from target 24 does not occur within the first range ambiguity interval. The maximum unambiguous range is cT/2, where c is the speed of light and T is the pulse recurrence interval. The maximum unambiguous Doppler is $\pm\lambda/4T$, where $\lambda$ is the free-space wavelength. Also in FIG. 1B, the reflected signals 24a and 24b from target 24 occur in the second and third range ambiguity intervals, respectively, so its range may be interpreted as less than its actual range. In FIG. 1B, increasing the PRF increases the maximum unambiguous Doppler but decreases the maximum unambiguous range, and decreasing PRF increases the maximum unambiguous range, but decreases the maximum unambiguous Doppler.

FIGS. 1C and 1D are simplified amplitude/Doppler plots illustrating the measured Doppler of the returned target signals due to the transmitted pulse(s) of FIG. 1A and FIG. 1B, respectively. In both FIGURES, it can be seen that the unambiguous Doppler region extends from 0 to PRF*$\lambda$/2. Any target Doppler velocities outside this region will fold over and be ambiguous. In FIG. 1C, no Doppler response is shown, because a single pulse cannot extract radial velocity information from the return signal. In FIG. 1D, the radial velocities of the targets 22 and 24 are shown by 22E and 24E, respectively. The radial velocity of target 24 is less than PRF*$\lambda$/2, and thus its Doppler, marked as 24F, is unambiguous. The radial velocity of target 22, however, exceeds this limit, and its Doppler, marked as 22F, is folded over and ambiguous, therefore it may be interpreted as less than its actual Doppler.

FIG. 2 illustrates a frequency-time plot of three sequential linear-FM pulses. In FIG. 2, the frequency range extends from frequency $-B/2$ to frequency $B/2$.

Various frequency-modulation schemes have been developed to allow continuous-wave transmission.

SUMMARY

A method according to an aspect of the disclosure is for radar determination of target range and velocity. The method comprises the steps of transmitting a plurality of continuous-wave linearly-frequency-modulated signals toward a target, to thereby generate return or reflected signals. The plurality of continuous-wave linearly-frequency-modulated signals may be contiguous, in that they may occur in sequence without intervening non-signal time. The method further includes the step of receiving return signals including contiguous continuous-wave linearly-frequency-modulated signals with superposed amplitude-range and frequency components associated with each target. The return signals are separated into predetermined different frequency bands, to thereby generate, within each of the frequency bands, band-limited return signal subpulses. Each of the band-limited return signal subpulses is frequency-modulated to a common frequency, such as baseband, to thereby generate a plurality of return signal subpulses at common frequencies. Each of the baseband return signal subpulses at common frequencies is matched-filtered with a linear-frequency-modulated matched filter at the common baseband frequency, to thereby generate matched-filtered return signal subpulses. The matched-filtered return signal subpulses are aligned in time, to thereby generate time-aligned matched-filtered return signal subpulses. The time-aligned matched-filtered return signal subpulses are Doppler-filtered, to thereby generate Doppler signals representing the range(s) and velocity(ies) of each target.

A radar system according to another aspect of the disclosure comprises a controller for generating pulses of linear frequency modulated electromagnetic signals at a given PRI, thereby giving a particular unambiguous target range at the particular PRI. A transmitter is responsive to the control means for transmitting electromagnetic signals toward a target in response to the pulses, thereby generating return signals. A receiver is provided for receiving the return signals to thereby generate received return signals. A processor is coupled to the receiver for filtering the received return signals into different frequency bands and for thereby separating the return signals into disparate-frequency subpulses to thereby generate, within each of the frequency bands, band-limited return signal subpulses. The processor also frequency-modulates each of the band-limited return signal subpulses to a common or to a baseband frequency to thereby generate a plurality of common-frequency or baseband-frequency return signal subpulses. The processor also matched-filters each of the baseband return signal subpulses with a linear-frequency-modulated matched filter response at the common or baseband frequency, to thereby generate matched-filtered return signal subpulses. The processor also aligns the matched-filtered return signal subpulses in time, to thereby generate time-aligned matched-filtered return signal subpulses, and Doppler-filtering the time-aligned matched-filtered return signal subpulses, to thereby generate Doppler signals representing the range and velocity of each target.

BRIEF DESCRIPTION OF THE DRAWING

FIG. 13 compares properties of the traditional radar with that of CW-LFM radar according to aspects of the disclosure.

DETAILED DESCRIPTION

As mentioned, pulse tagging allows the various transmitted pulses to be separately identified. If a series of N orthogonal pulses or waveforms are transmitted, the maximum unambiguous range can increase by a factor of N over untagged pulses. The maximum unambiguous Doppler can be maintained or remains the same so long as the various orthogonal pulses can be cohered (given a common phase and time) for integration. Frequency modulation can be effective in providing orthogonality.

Figure 1:
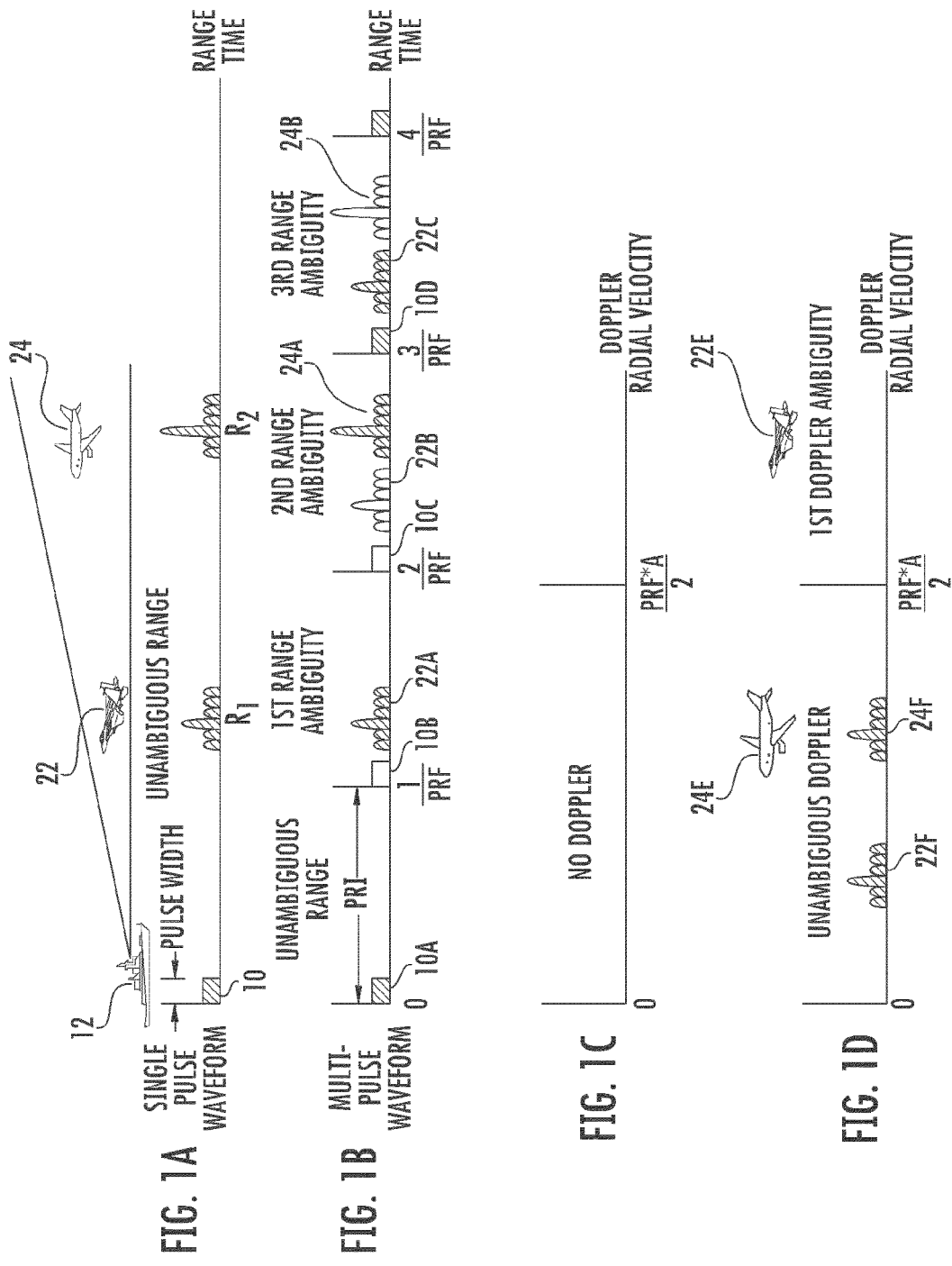
FIG. 1A is a simplified amplitude-range/time diagram illustrating the unambiguous range associated with electromagnetic or radar transmissions.
FIG. 1B is a similar diagram, showing the pulse recurrence interval (PRI)
FIG. 1C is a simplified amplitude/Doppler diagram illustrating the lack of Doppler information from a single pulse, as of that of FIG. 1A)
FIG. 1D is a similar diagram illustrating the unambiguous Doppler associated with the transmission of a series of pulses, as those of FIG. 1B]
Figure 2:
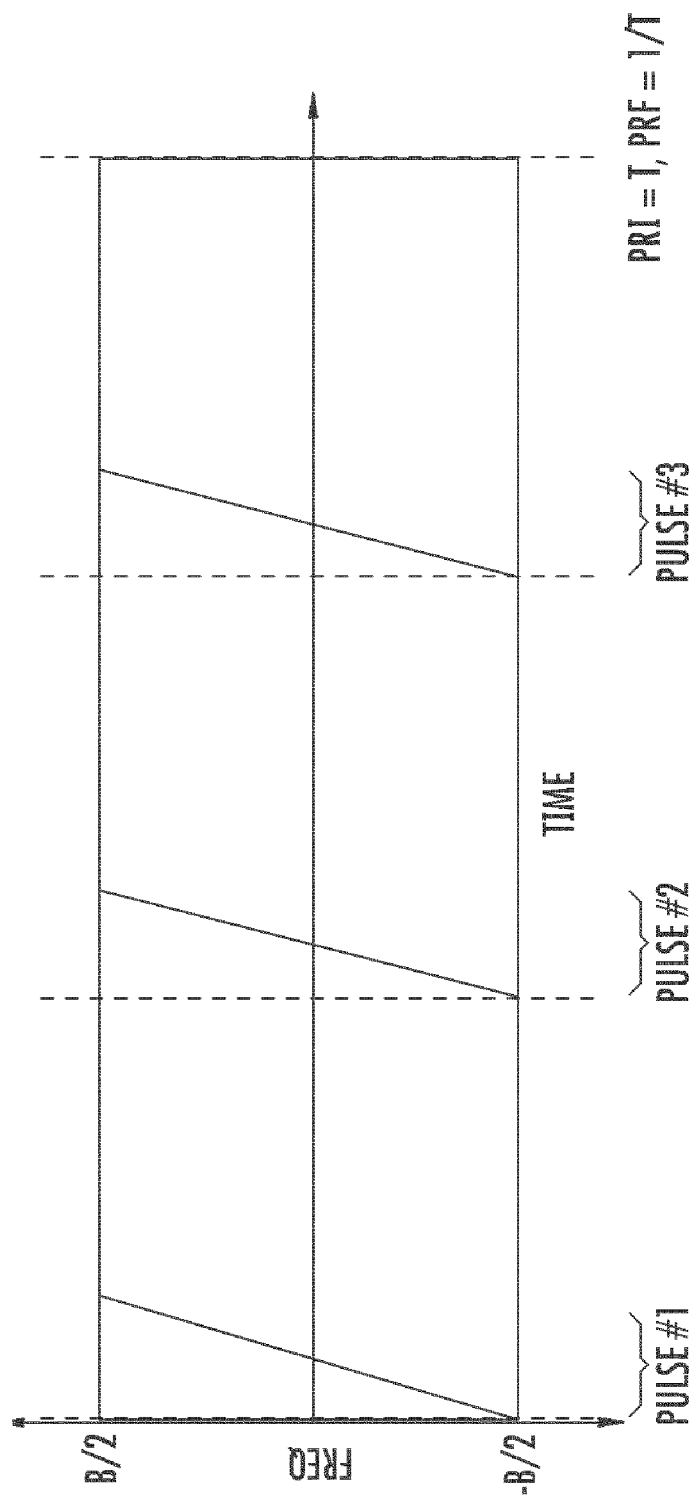
FIG. 2 is a plot of frequency versus time for a prior-art set of three non-contiguous linear-frequency-modulation (LFM) pulses.
Figure 3:
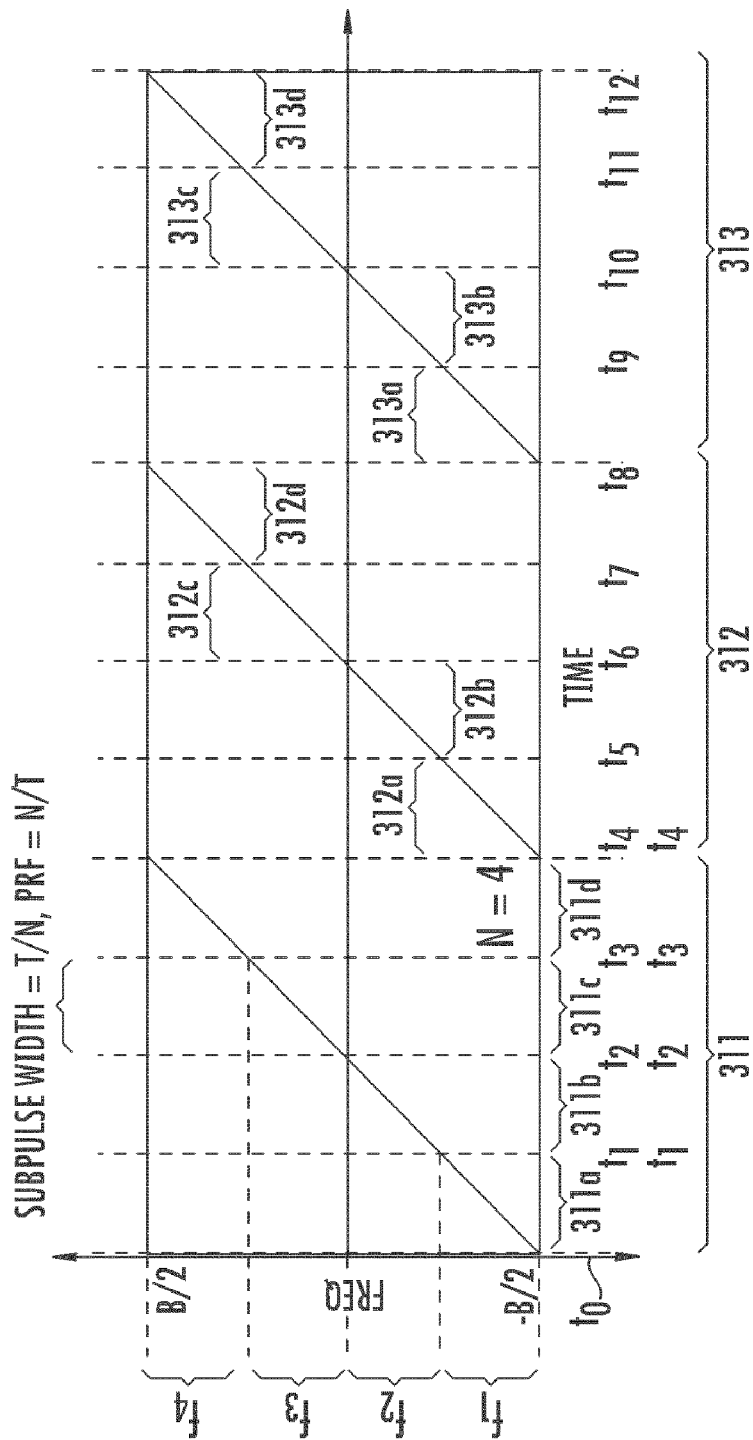
FIG. 3 is a plot of frequency versus time for three contiguous linear-frequency-modulation (LFM) pulses, showing the locations of the various subpulses.

According to an aspect of the disclosure, each CW-LFM pulse of a set of contiguous LFM pulses can be viewed and treated as a group of N subpulses. FIG. 3 illustrates a set 310 of three contiguous CW-LFM pulses 311, 312, and 313. The three pulses are contiguous, in that the second pulse 312 begins at the same time t4 as the end of the first pulse 311, and the third pulse 313 starts at time t8 concurrently with the end of the second pulse 312. In FIG. 3, the frequency of first pulse 311 ranges from $-B/2$ at time t0 to $B/2$ at time t4. The frequency of second pulse 312 of FIG. 3 ranges from $-B/2$ at time t4 to $B/2$ at time t8. The frequency of third pulse 313 of FIG. 3 ranges from −B/2 at time t8 to B/2 at time t12. Each pulse 311, 312, and 313 can be viewed as being made up or composed of a plurality of linear FM pulses, the frequency ranges of which in total range from −B/2 to B/2, for a total frequency range of B. For example, first pulse 311 may be viewed as being made up of N=4 subpulses 311a, 311b, 311c, and 311d, each with a frequency range of B/4. Similarly, second pulse 312 may be viewed as being made up of N=4 subpulses 312a, 312b, 312c, and 312d, each with a frequency range of B/4, and third pulse 313 may be viewed as being made up of N=4 subpulses 313a, 313b, 313c, and 313d, each with a frequency range of B/4. Each subpulse covers a different frequency range than other subpulses of the same pulse, and therefore all subpulses in a given pulse are orthogonal. For example, subpulse 311a of FIG. 3 has a frequency range designated f1, subpulse 311b has a frequency range designated f2, subpulse 311c of FIG. 3 has a frequency range designated f3, and subpulse 311d of FIG. 3 has a frequency range designated f4. Each subpulse has duration of (t4−t0)/N and each pulse has duration of T=(t4−t0). According to an aspect of the disclosure, linear-frequency-modulation pulses, such as pulses 311, 312, and 313 of FIG. 3 are transmitted by a radar (lidar, sonar) system. When return or reflected signals are received, the subpulses may be viewed as being "tagged" by the identifying frequency of the subpulse, and when so identified can be treated or processed as N subpulses. With particular post-reception processing, the maximum Doppler can be increased by a factor of N while maintaining the unambiguous range equal to that of the basic pulse duration. This technique may be termed PRF Alteration on Receive or PAR.

Figure 4:
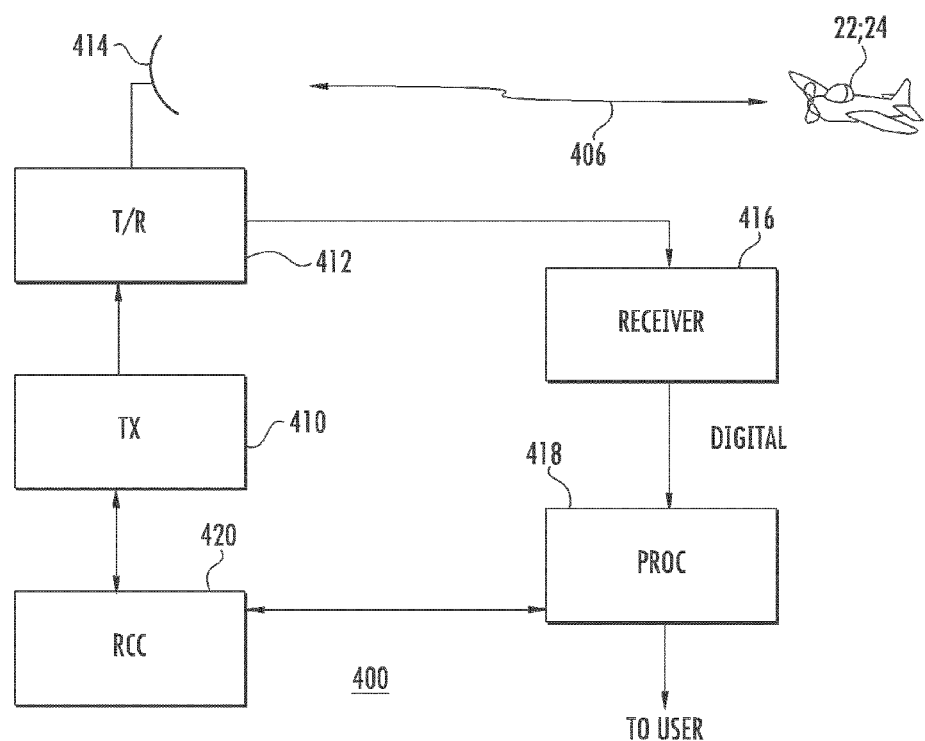
FIG. 4 is a simplified block diagram of a radar system which uses an aspect of the disclosure.

FIG. 4 is a simplified block diagram of a radar system 400 according to an aspect of the disclosure. In FIG. 4, radar 400 includes a signal generating transmitter (TX) 410 which generates linear FM pulses of duration T, such as those of FIG. 3, under control of a radar control computer (RCC). The linear FM pulses are applied by way of a transmit/receive (T/R) device 412 to an antenna illustrated by 414. Those skilled in the art know that the functions represented by TX block 410 and T/R 412 may be distributed among a plurality of locations if antenna 414 is an array antenna. Antenna 414 transmits electromagnetic signals at each pulse, and in the presence of a target 22 or 24 receives return or reflected signals, as suggested by "lightning bolt" symbol 406. Return signals are routed by T/R 412 to a receiver 416, which performs conventional analog processing such as low-noise amplification, frequency filtering, and downconversion to baseband or IF frequencies. For simplicity, receiver 416 is assumed to also provide time and amplitude quantization such as is ordinarily provided to convert analog signals into digitized signals for further processing. The output of receiver 416 includes I and Q components of the return signal. The digitized return signals are applied to a processor (PROC) illustrated as a block 418, also under the control of radar control computer 420. Processing according to an aspect of the disclosure is performed in processor 418.

Figure 5:
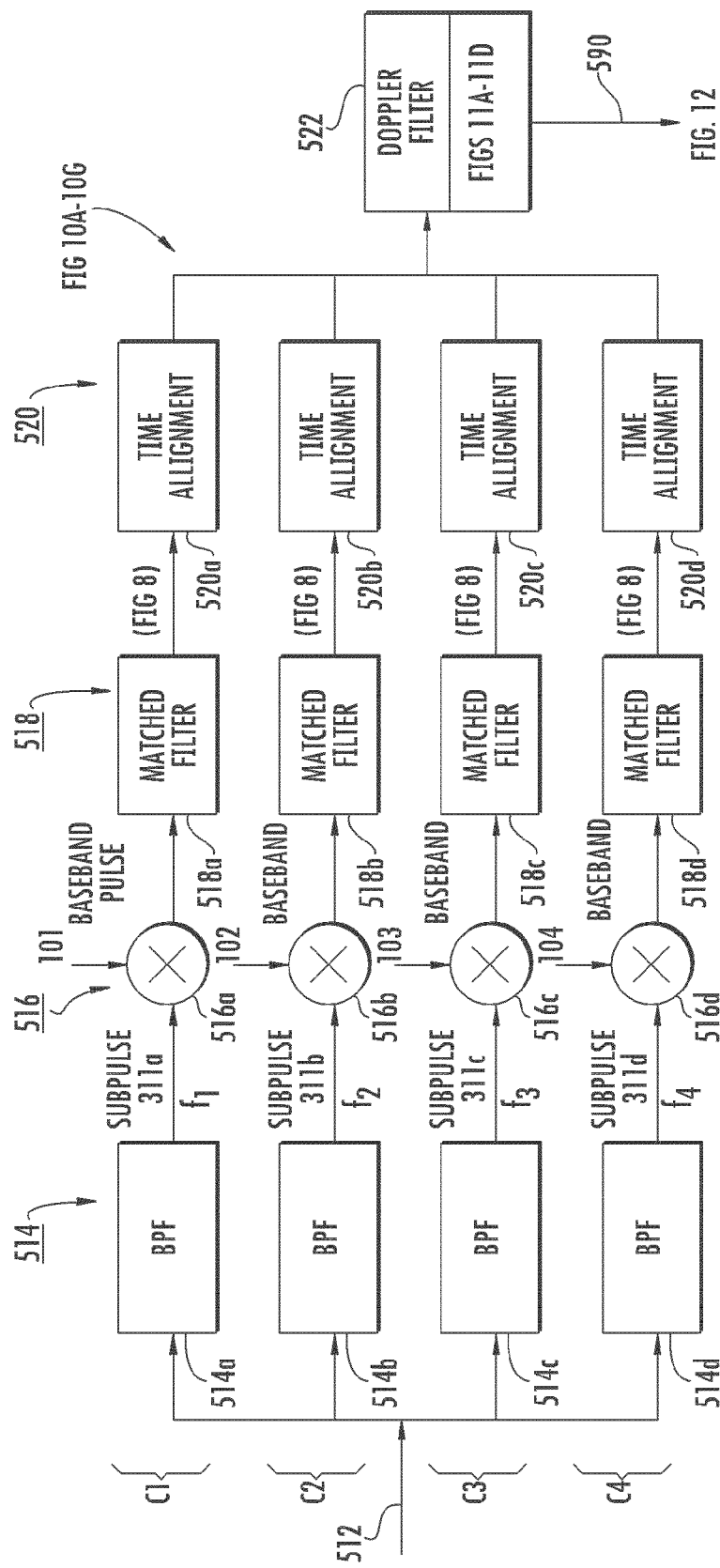
FIG. 5 is a simplified block diagram representing the processing performed according to an aspect of the disclosure in the radar system of FIG. 4.

FIG. 5 is a simplified block diagram conceptually illustrating the nature of the processing 500 performed in processor 418 of FIG. 4. In FIG. 5, the return signal from receiver 416 is applied by way of a path 512 in parallel or in common to a plurality of channels designated C1, C2, C3, and C4, only four of which are illustrated. Those skilled in the art will recognize that there may be more channels than four, or as few as one. In FIG. 5, each of the four channels includes a bandpass filter of a set 514 of bandpass filters (BPF), for separating or extracting the subpulses from each other. As an example, bandpass filter 514a of set 514 may be tuned or set to pass return signal in the frequency range f1 of FIG. 3, bandpass filter 514b of set 514 of bandpass filters may be tuned or set to pass return signal in the frequency range f2 of FIG. 3, bandpass filter 514c of set 514 of bandpass filters may be tuned or set to pass return signal in the frequency range f1 of FIG. 3, and bandpass filter 514d of set 514 of bandpass filters may be tuned or set to pass return signal in the frequency range f4 of FIG. 3. Thus, the output of BPF 514a is subpulse 311a, the output of BPF 514b is subpulse 311b, the output of BPF 514c is subpulse 311c, and the output of BPF 514d is subpulse 311d. Those skilled in the art know how to perform bandpass filtering.

It must be understood that the presence of a return signal in any channel C1, C2, C3, or C4 of FIG. 5 depends upon the existence of a target at a range corresponding to the band of the subpulse. That is, in the absence of a target, return signals do not exist. Explanations of the operation of radar systems assume that targets at the appropriate ranges exist, so that a return signal is present.

Figure 6:
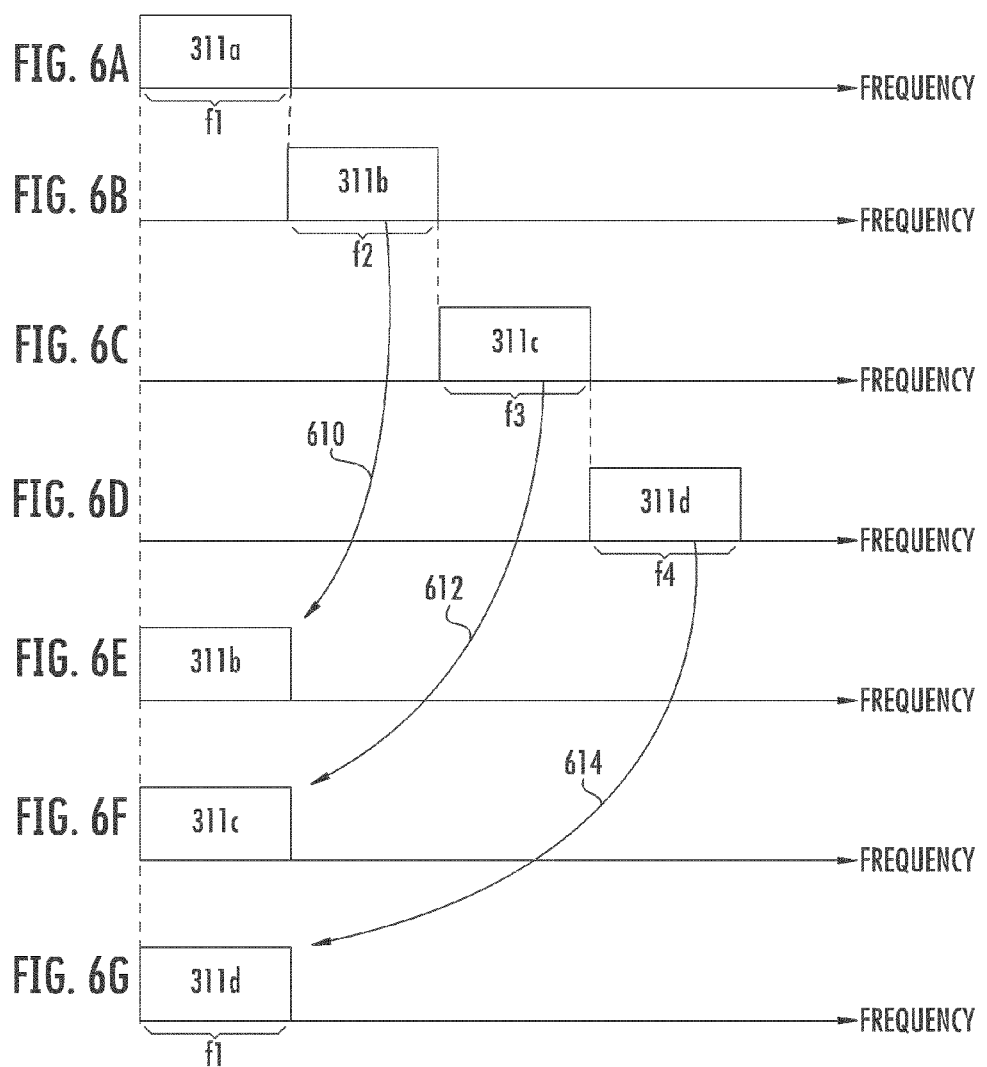
FIGS. 6A, 6B, 6C, 6D, 6E, 6F, and 6G are frequency plots illustrating frequency conversion of radar pulses, according to an aspect of the disclosure, to a common frequency.

The separated subpulses 311a, 311b, 311c, and 311d at the outputs of the bandpass filters of set 514 of bandpass filters of FIG. 5 are individually downconverted to an intermediate frequency or to baseband. The downconversion is accomplished in a set 516 of multipliers or frequency converters. Downconversion to an intermediate frequency or to baseband are well known in the art. In FIG. 5, subpulses corresponding to 311a from BPF 514a are applied to a multiplier 516a and are multiplied by a signal designated LO1 to convert the subpulse to baseband. If subpulse 311a is already at baseband, no conversion is needed, and multiplier 516a may be dispensed with. Subpulses 311b, 311c, and 311d are applied to multipliers 516b, 516c, and 516d, respectively, together with LO2, LO3, and LO4 signals, respectively, to convert to baseband or to the selected intermediate frequency. For simplicity in explanation, conversion to baseband is assumed, but intermediate frequencies may be used. FIGS. 6A through 6G together represent the frequency conversion to baseband as may be performed by set 516 of multipliers of FIG. 5. FIG. 6A represents subpulse 311a at baseband, with a frequency range of f1. FIG. 6B represents pulse 311b in frequency range f2, and arrow 610 represents the conversion to the frequency range f1. FIG. 6C represents pulse 311c in frequency range f3, and arrow 612 represents the conversion to the frequency range f1. FIG. 6D represents pulse 311d in frequency range f4, and arrow 614 represents the conversion to the frequency range f1. The result of the frequency conversion is to adjust the frequency ranges of the various subpulses to a common frequency range. However, the timing of the various pulses is not common, in that they occur sequentially rather than simultaneously.

Figure 7:
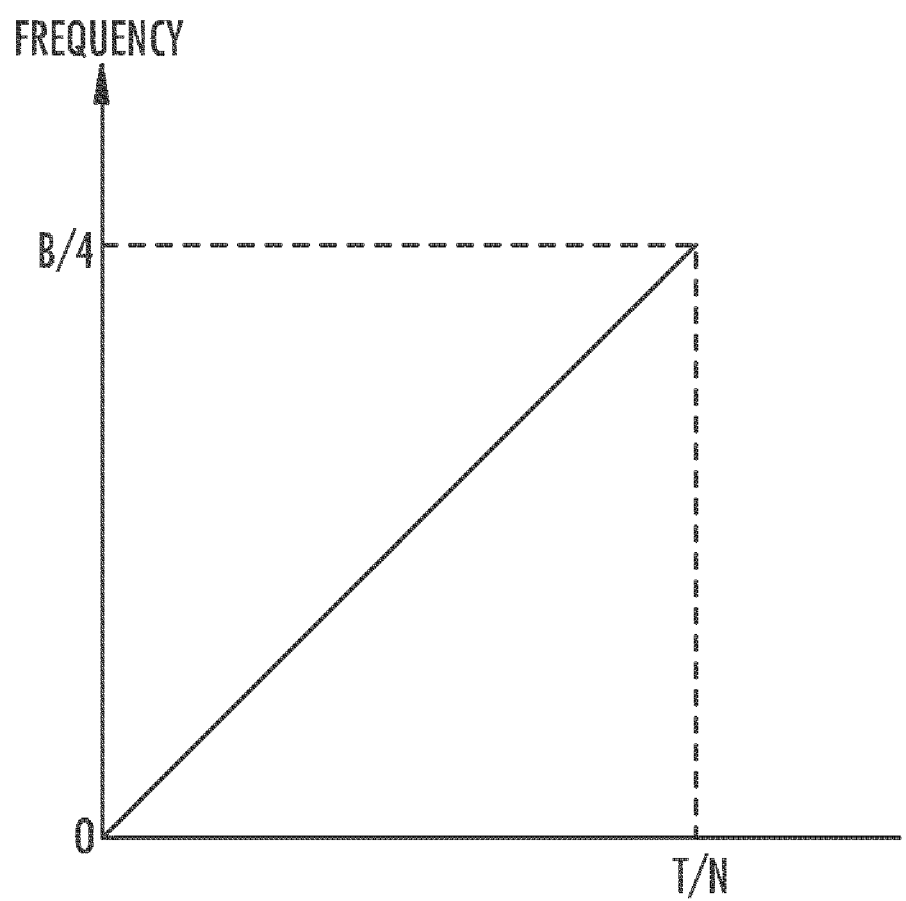
FIG. 7 is a plot of frequency versus time illustrating the basis for matched filtering according to an aspect of the disclosure in the radar of FIG. 4.

The various subpulses converted to a common frequency which are produced at the output of the set 516 of frequency converters or multipliers of FIG. 5 are applied to a set 518 of filters matched to linear FM with a bandwidth of B/N and pulse width T/N. Matched filtering is well known in the art. The baseband signal or pulses from downconverter 516a are applied to a matched filter 518a, the baseband signal or pulses from downconverter 516b are applied to a matched filter 518b, the baseband signal or pulses from downconverter 516c are applied to a matched filter 518c, and the baseband signal or pulses from downconverter 516d are applied to a matched filter 518d. FIG. 7 is a simplified illustration of the matched filtering for each subpulse. Since all of the subpulses being matched-filtered in set 518 of matched filters are at baseband, the frequency range of each matched filter of set 518 of FIG. 5 is the same as that of all the other matched filters of set 518. All of the pulses arriving at set 518 of matched filters of FIG.

5 originated from transmission of linear-FM signals, so the slope or rate of change of frequency as a function of time is the same for all subpulses of a pulse. Reference to FIG. 3 shows that each subpulse, as for example subpulse 311a, has a frequency range or bandwidth of B/4 (for the case of N=4). Consequently, the characteristic of each matched filter of set 518 of matched filters has a frequency slope of B/4 Hz in a time equal to T/N, as illustrated in FIG. 7.

Figure 8:
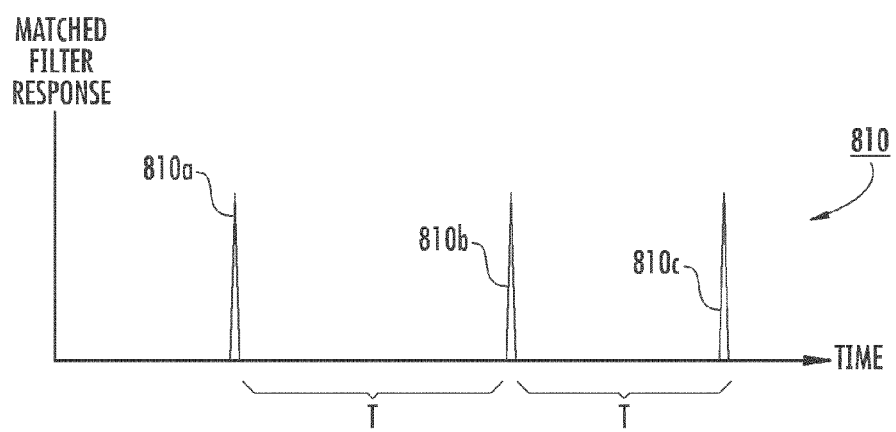
FIG. 8 is a plot of matched filter response in the presence of a target in the radar of FIG. 4.

As mentioned, the presence of a return signal assumes the presence of a target at the appropriate range. The output of set 518 of matched filters of FIG. 5 will produce a matched-filter response from one of the filters for each target in response to each transmitted pulse. Thus, a matched filter of set 518 will produce one match signal for each target in response to each transmitted pulse. FIG. 8 illustrates pulse-to-pulse outputs from a single matched filter of set 518 of matched filters in the presence of a single target. In FIG. 8, the output of one matched filter of set 518 is illustrated as including a set 510 of a plurality of match peaks 810a, 810b, 810c, spaced apart in time by pulse recurrence interval T. If the target is in radial motion relative to the radar set, the period between successive ones of the matched-filter pulses of set 810 will change by an amount related to the radial velocity of the target.

Figure 9:
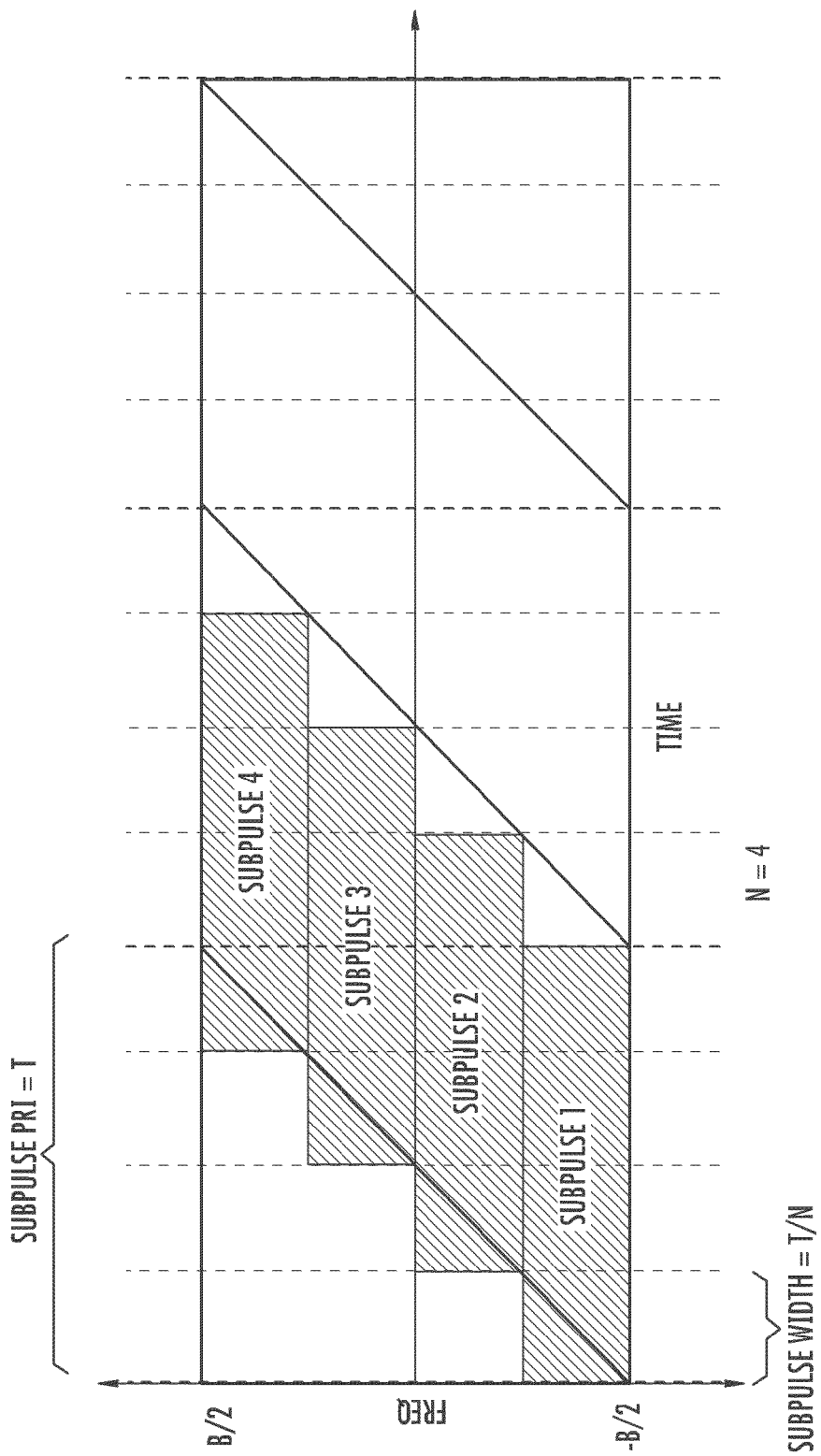
FIG. 9 is a plot of the frequency versus time illustrating the division of the single transmitted LFM into multiple orthogonal subpulses.

FIG. 9 is a plot of frequency versus time illustrating the division of the single transmitted LFM pulse into multiple orthogonal subpulses. Because each of the subpulses extends for the duration of the original LFM pulse, the maximum unambiguous range is maintained while performing PAR processing. It can also be seen that the PRI is increased by a factor equal to the number of subpulses per pulse, thereby increasing the maximum unambiguous Doppler. Also, it can be seen that the bandwidth for each of the subpulses is equal to the bandwidth of the original pulse divided by a factor equal to the number of subpulses per pulse, thereby decreasing the range resolution by this factor.

Figure 10:
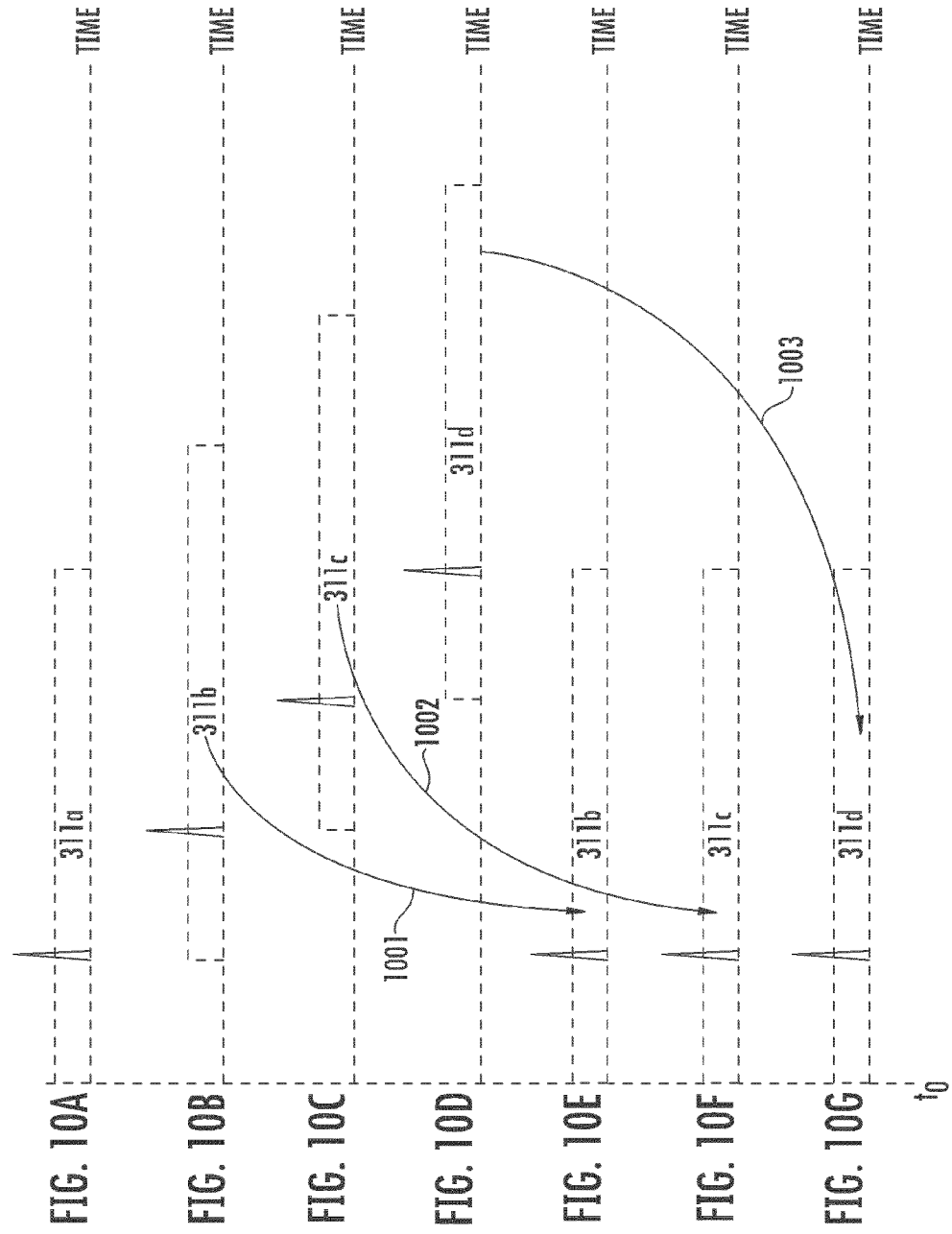
FIGS. 10A, 10B, 10C, 10D, 10E, 10F, and 10G are time plots illustrating how the various subpulses are aligned in time.
Figure 11:
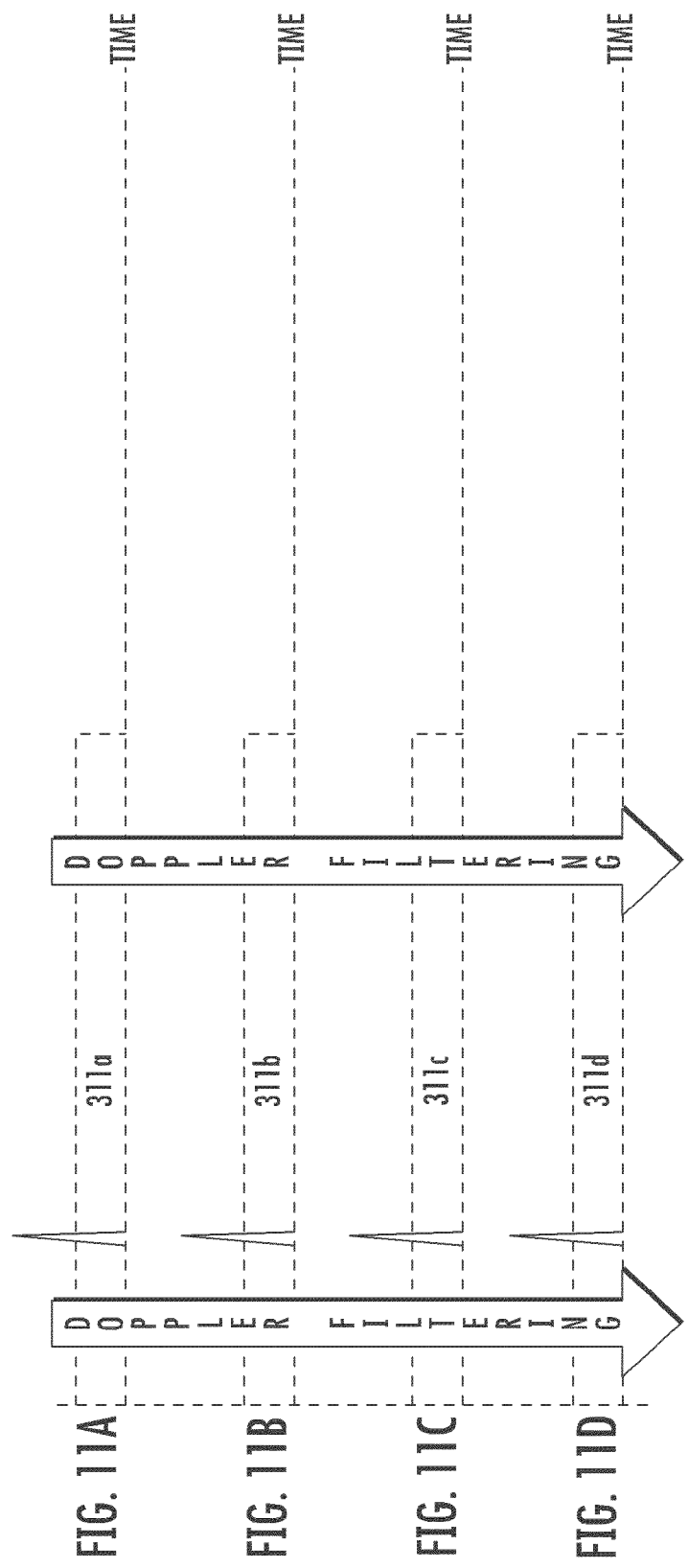
FIGS. 11A, 11B, 11C, and 11D are time plots illustrating Doppler filtering among the time-aligned subpulses of FIGS. 10A, 10B, 10C, 10D, 10E, 10F, and 10G to determine target Doppler.

The frequency-aligned, matched-filtered pulses of FIGS. 6A and 6E through 6G are not, in general, concurrent in time. From each of the matched filters of set 518 of matched filters of FIG. 5 the frequency-aligned, matched-filtered pulses, each of which may be similar to the plot of FIG. 8, flow to a corresponding time alignment function of a set 520 of time alignment blocks 520a, 520b, 520c, and 520d. The functions of the time alignment blocks 520a, 520b, 520c, and 520d are illustrated in FIGS. 10A, 10B, 10C, 10D, 10E, 10F, and 10G. Time alignment is well known in the art, and should require no additional explanation. More particularly, each time alignment block of set 520 of FIG. 5 receives one of the frequency-aligned, matched-filtered pulses, and translates it to a common time. For example, the frequency-aligned, matched-filtered pulse resulting from subpulse 311a of FIG. 10A is applied to time alignment block 520a of FIG. 5, and is only time converted if not at reference time t0. The frequency-aligned, matched-filtered pulse resulting from subpulse 311b of FIG. 10B is applied to time alignment block 520b of FIG. 5, and time converted to begin at reference time t0, as suggested by arrow 1001. The frequency-aligned, matched-filtered pulse resulting from subpulse 311c of FIG. 10C is applied to time alignment block 520c of FIG. 5, and time converted, as suggested by arrow 1002, to begin at reference time t0. Finally, the frequency-aligned, matched-filtered pulse resulting from subpulse 311d of FIG. 10D is applied to time alignment block 520d of FIG. 5, and time converted, as suggested by arrow 1003, to begin at reference time t0.

The result of the time alignment of the various pulses in set 520 of time alignment blocks of FIG. 5 is a set of time- and frequency-aligned matched-filtered pulses, such as those illustrated as 311a, 311b, 311c, and 311d of FIGS. 11A, 11B, 11C, and 11D, respectively. Doppler filtering is performed on the pulses of FIGS. 11A through 11D in block 522 of FIG. 5, in the direction illustrated by the Doppler Filtering arrows in FIGS. 11A through 11D. In the indicated locations, there are no target returns, so Doppler filtering, while possible, will not result in meaningful information. However, when performed at and near the indicated pulse region, the subpulse-to-subpulse Doppler filtering produces time offset information resulting from the radial motion of the target. Such Doppler processing is well known in the art and requires no further explanation. The Doppler information is made available on path 590 of FIG. 5.

Figure 12:
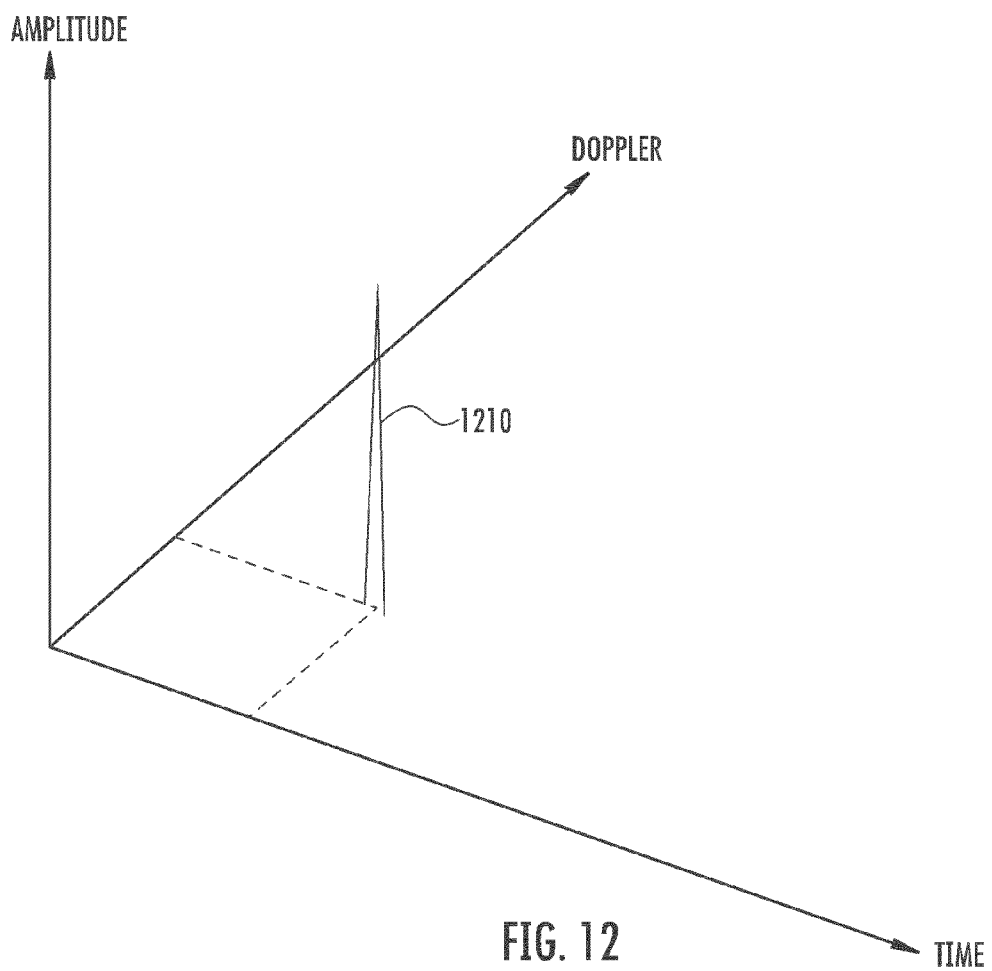
FIG. 12 plots the target position as a function of amplitude, time, and Doppler.

FIG. 12 represents the information available as a result of the processing in the radar system of FIG. 5. More particularly, the target return signal amplitude is represented along the amplitude axis, at a time along the Time axis related to the range of the target, and with a particular Doppler along the Doppler axis. Such plots are well known. While a particular ordering of the processing steps has been illustrated in FIG. 5, with some restrictions, other orderings of these steps are possible, and will yield identical results. For example, matched filter processing can occur after Doppler filtering has been performed. Restrictions on orderings include the requirements that frequency-alignment, bandpass filtering, and time alignment (in any order) should occur prior to Doppler filtering.

The table of FIG. 13 tabulates various radar parameters, and in two columns compares the corresponding values for a traditional CW-LFM radar and a CW-LFM radar according to aspects of the disclosure.

Unambiguous range, unlike unambiguous Doppler, cannot be improved by the methods of the disclosure once the PRI is set. Typically, the PRI would be set to provide as large an unambiguous range as possible, and to improve the unambiguous Doppler according to aspects of the disclosure.

The use of the disclosure allows greatly increased maximum unambiguous Doppler without trading off maximum unambiguous range. There is ordinarily a tradeoff between range resolution and maximum unambiguous Doppler. Because the method of the disclosure is performed on receive, the tradeoff can be performed many times.

Figure 14:
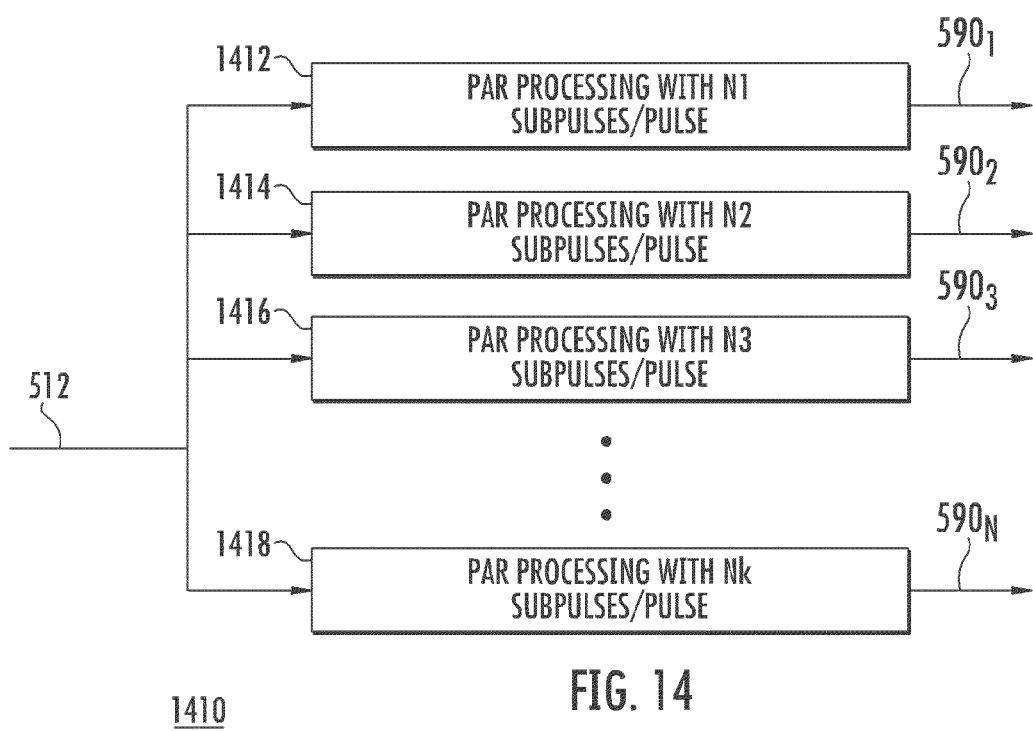
FIG. 14 is a simplified block diagram of Pulse-Recurrence-Interval Alteration on Receive (PAR) processing to simultaneously produce multiple receive PRFs.

FIG. 14 is a simplified block diagram illustrating how multiple PRIs are simultaneously generated. In FIG. 14, a plurality of PAR processing blocks 1412, 1414, 1416, . . . , 1418 of a set 1410 of PAR processing blocks are fed in common with return signals by way of path 512. Each PAR processing block of set 1410 corresponds generally with the processing 500 of FIG. 5. PAR processing block 1412 processes with N1 subpulses per pulse (subpulses/pulse), PAR processing block 1414 processes with N2 subpulses per pulse, PAR processing block 1416 processes with N3 subpulses per pulse, . . . , and PAR processing block 1418 processes with Nk subpulses per pulse. Thus, the value of N1 in PAR processing block 1412 might be selected to equal four, in which case PAR processor 1412 corresponds exactly with processor 500 of FIG. 5. Each other PAR processor of FIG. 14 would have a different number of bandpass filters to thereby define a different number of subpulses. Each PAR processor of set 1410 of FIG. 14 produces different unambiguous Doppler information.

Multiple PRFs can be simultaneously used to perform the tradeoff multiple times between range resolution and maximum unambiguous Doppler. However, both range resolution and maximum unambiguous Doppler cannot both be increased simultaneously. Instead, the multiple PRFs provide different views of the targets present. For example, with a few subpulses, we may discern that two targets are present in range, but we are not sure if any of their velocities are ambiguous. For the same targets, with many subpulses, we may only see one target in range, but can resolve two targets in Doppler and can ascertain that their Dopplers are unambiguous up to a much higher velocity than before. The particular application of the radar system will determine how these different views of the target are combined. Thus, since PRF/PRI is determined on receive, we can simultaneously perform multiple tradeoffs to get various views of any targets present in range and Doppler.

A method according to an aspect of the disclosure is for radar determination of target range and velocity. The method comprises the steps of transmitting (406) a plurality of contiguous continuous-wave linearly-frequency-modulated signals (311, 312, 313) toward a target (22, 24), to thereby generate return or reflected signals. The method further includes the step of receiving (416) return signals including contiguous continuous-wave linearly-frequency-modulated signals with superposed amplitude-range and frequency components associated with each target. The return signals are separated (514) into predetermined different frequency bands (t0-t1, t1-t2, t2-t3, . . . ), to thereby generate, within each of the frequency bands, band-limited return signal subpulses (311*a*, 311*b*, 311*c*, . . . ). Each of the band-limited return signal subpulses (311*a*, 311*b*, 311*c*, . . . ) is frequency-modulated for conversion to a common frequency (FIGS. 6A through G), such as baseband, to thereby generate a plurality of return signal subpulses at common frequencies (f1). Each of the baseband return signal subpulses at common frequencies is matched-filtered (518) with a linear-frequency-modulated matched filter at the common or baseband frequency (f1), to thereby generate matched-filtered return signal subpulses (FIGS. 6A, 6E, 6F, 6G). The matched-filtered return signal subpulses are aligned in time (520), to thereby generate time-aligned matched-filtered return signal subpulses (FIGS. 10A, 10E, 10F; and 10G). The time-aligned matched-filtered return signal subpulses (FIGS. 10A, 10E, 10F; and 10G) are Doppler-filtered (522), to thereby generate Doppler signals (1210) representing the range(s) and velocity(ies) of each target (22, 24).

A radar system according to an aspect of the disclosure comprises a controller (420) for generating pulses (Pulse #1, pulse #2, . . . ) of linear frequency modulated electromagnetic signals at a given PRI, thereby giving a particular unambiguous target range at the particular PRI. A transmitter (410) is responsive to the control means for transmitting electromagnetic signals toward a target in response to the pulses, thereby generating return signals. A receiver (412, 418) is provided for receiving the return signals to thereby generate received return signals. A processor (418) is coupled to the receiver for filtering the received return signals into different frequency bands (310) and for thereby separating the return signals into disparate-frequency subpulses (311*a*, 311*b*, . . . ) to thereby generate, within each of the frequency bands, band-limited return signal subpulses. The processor (418) also frequency-modulates each of the band-limited return signal subpulses to a common or to a baseband frequency (FIGS. 6A through 6G) to thereby generate a plurality of common-frequency or baseband-frequency return signal subpulses. The processor (418) also match-filters (FIG. 7) each of the baseband return signal subpulses with a linear-frequency-modulated matched filter response at the common or baseband frequency, to thereby generate matched-filtered return signal subpulses. The processor (418) also aligns the matched-filtered return signal subpulses in time (FIGS. 10A through 10G), to thereby generate time-aligned matched-filtered return signal subpulses, and Doppler-filtering the time-aligned matched-filtered return signal subpulses (311*b*, 311*c*, . . . ), to thereby generate Doppler signals representing the range and velocity of each target.

The invention claimed is:

1. A method for radar determination of target range and velocity, said method comprising the steps of:
    transmitting a plurality of continuous-wave linearly-frequency-modulated signals toward a target, to generate return signals;
    receiving return signals including contiguous continuous-wave linearly-frequency-modulated signals with superposed amplitude-range and frequency components associated with the target;
    separating said return signals into predetermined different frequency bands, to generate, within each of said frequency bands, band-limited return signal subpulses;
    frequency-modulating each of said band-limited return signal subpulses to a common baseband frequency to therby generate a plurality of baseband return signal subpulses;
    match-filtering each of said baseband return signal subpulses with a linear-frequency-modulated matched filter at said common baseband frequency, to generate matched-filtered return signal subpulses;
    aligning said matched-filtered return signal subpulses in time, to generate time-aligned matched-filtered return signal subpulses; and
    Doppler-filtering said time-aligned matched-filtered return signal subpulses, to generate Doppler signals representing the range and velocity of said target.

2. A method according to claim 1, wherein said step of transmitting a plurality of continuous-wave linearly-frequency-modulated signals toward a target, to thereby generate return signals, includes the step of transmitting a plurality of contiguous continuous-wave linearly-frequency-modulated signals toward a target.

3. A radar system, comprising:
    a controller configured to generate pulses of linear frequency modulated electromagnetic signals at a given pulse recurrence interval (PRI), thereby giving an unambiguous target range at the particular PRI;
    a transmitter responsive to said controller configured to transmit electromagnetic signals in response to said pulses toward a target, thereby generating return signals;
    a receiver configured to generate representations of said return signals; and
    a processor coupled to said receiver and configured to:
        filter said representations of said return signals into different frequency bands and for thereby separating said return signals into disparate-frequency subpulses, to thereby generate, within each of said frequency bands, band-limited return signal subpulses,
        frequency modulate each of said band-limited return signal subpulses to a common baseband frequency to thereby generate a plurality of baseband return signal subpulses,
        matched-filter each of said baseband return signal subpulses with a linear-frequency-modulated matched filter at said common baseband frequency, to thereby generate matched-filtered return signal subpulses,
        align said matched-filtered return signal subpulses in time, to thereby generate time-aligned matched-filtered return signal subpulses, and
        Doppler-filter said time-aligned matched-filtered return signal subpulses, to thereby generate Doppler signals representing the range and velocity of each target.

4. A system according to claim 3, wherein said pulses of linear frequency modulated electromagnetic signals at a given PRI are contiguous.

5. A method for radar determination of target range and velocity, said method comprising the steps of:
   transmitting a plurality of signals toward a target;
   receiving return signals associated with the target;
   separating said return signals into predetermined different frequency bands, to generate return signal subpulses;
   frequency-modulating each of said return signal subpulses to a common baseband frequency to generate a plurality of baseband return signal subpulses;
   match-filtering each of said baseband return signal subpulses with a linear-frequency-modulated matched filter to generate matched-filtered return signal subpulses;
   aligning said matched-filtered return signal subpulses in time to generate time-aligned matched-filtered return signal subpulses; and
   Doppler-filtering said time-aligned matched-filtered return signal subpulses to generate Doppler signals representing the range and velocity of said target.

6. A method according to claim 5, wherein said plurality of signals comprise a plurality of continuous-wave linearly-frequency-modulated signals.

7. A method according to claim 5, wherein said return signals include contiguous continuous-wave linearly-frequency-modulated signals with superposed amplitude-range and frequency components.

8. A method according to claim 5, wherein said return signal subpulses comprise band-limited return signal subpulses.

9. A method according to claim 5, wherein said step of transmitting a plurality of signals toward a target includes the step of transmitting a plurality of contiguous continuous-wave linearly-frequency-modulated signals toward a target.

10. A system for radar determination of target range and velocity, said system comprising a processor configured to execute instructions that when executed cause the system to perform the method comprising:
   transmitting a plurality of signals toward a target;
   receiving return signals associated with the target;
   separating said return signals into predetermined different frequency bands, to generate return signal subpulses;
   frequency-modulating each of said return signal subpulses to a common baseband frequency to generate a plurality of baseband return signal subpulses;
   match-filtering each of said baseband return signal subpulses with a linear-frequency-modulated matched filter to generate matched-filtered return signal subpulses;
   aligning said matched-filtered return signal subpulses in time to generate time-aligned matched-filtered return signal subpulses; and
   Doppler-filtering said time-aligned matched-filtered return signal subpulses to generate Doppler signals representing the range and velocity of said target.

11. A system according to claim 10, wherein said plurality of signals comprise a plurality of continuous-wave linearly-frequency-modulated signals.

12. A system according to claim 10, wherein said return signals include contiguous continuous-wave linearly-frequency-modulated signals with superposed amplitude-range and frequency components.

13. A system according to claim 10, wherein said return signal subpulses comprise band-limited return signal subpulses.

14. A system according to claim 10, wherein said step of transmitting a plurality of signals toward a target includes the step of transmitting a plurality of contiguous continuous-wave linearly-frequency-modulated signals toward a target.

15. A radar system, comprising:
   a controller configured to generate pulses of linear frequency modulated electromagnetic signals at a given pulse recurrence interval (PRI), thereby giving an unambiguous target range at the particular PRI;
   a transmitter responsive to said controller configured to transmit electromagnetic signals in response to said pulses toward a target, thereby generating return signals;
   a receiver configured to generate representations of said return signals; and
   a processor coupled to said receiver, said processor configured to execute instructions that cause the processor to perform the method of:
      filtering said representations of said return signals into different frequency bands and for thereby separating said return signals into disparate-frequency subpulses, to thereby generate, within each of said frequency bands, band-limited return signal subpulses,
      frequency-modulating each of said band-limited return signal subpulses to a common baseband frequency to thereby generate a plurality of baseband return signal subpulses,
      matched-filtering each of said baseband return signal subpulses with a linear-frequency-modulated matched filter at said common baseband frequency, to thereby generate matched-filtered return signal subpulses,
      aligning said matched-filtered return signal subpulses in time, to thereby generate time-aligned matched-filtered return signal subpulses, and
      Doppler-filtering said time-aligned matched-filtered return signal subpulses, to thereby generate Doppler signals representing the range and velocity of each target.

16. A system according to claim 15, wherein said pulses of linear frequency modulated electromagnetic signals at a given PRI are contiguous.

* * * * *